United States Patent [19]

Fernandez de Castro

[11] 3,919,407

[45] Nov. 11, 1975

[54] METHOD FOR QUANTITATIVE DETERMINATION OF RENIN ACTIVITY IN BLOOD

[76] Inventor: Aurora L. Fernandez de Castro, 3311 Mall Court, Apt. C2, Michigan City, Ind. 46368

[22] Filed: Nov. 28, 1973

[21] Appl. No.: 419,623

[52] U.S. Cl. .............................. 424/12; 195/103.5
[51] Int. Cl.² ...................... C12K 1/00; G01N 31/14; G01N 33/16
[58] Field of Search ..................... 195/103.5; 424/12

[56] References Cited
OTHER PUBLICATIONS
Schaechtelin et al. – Chem. Abst. Vol. 65 (1966) p. 15725a.

Kazuo et al. – Chem. Abst. Vol. 76 (1972) p. 55609c.

*Primary Examiner*—Sam Rosen
*Attorney, Agent, or Firm*—Abraham A. Saffitz

[57] ABSTRACT

A method for the quantitative determination of renin activity in blood utilizing the measurement of Angiotensin I by treating the blood with ethylenediaminetetraacetic acid (EDTA) and the plasma with phenylmethyl sulfonylfluoride (PMSF) at a preferred pH to maximize the production of Angiotensin I.

2 Claims, No Drawings

METHOD FOR QUANTITATIVE DETERMINATION OF RENIN ACTIVITY IN BLOOD

BACKGROUND OF THE INVENTION

The measurement of plasma renin activity (PRA) is considered of primary importance in the investigation of hypertensive conditions. For example, it is widely employed to determine whether hypertension is due to primary aldosteronism or secondary aldosteronism. Both conditions reveal a high aldosterone secretion rate; primary aldosteronism occuring with a low renin activity, secondary aldosteronism exhibiting a high renin activity. It is, then, important to distinguish between low renin values and the lower part of the normal spectrum. In other words, conditions under which plasma renin activity are measured must be maximized to differentiate truly low renin values from the low but normal values. Most commercial kits on the market that determine Angiotensin I as a measure of PRA have neglected this consideration and, as a result, cannot differentiate between truly low renin values and low but normal values.

PRA is also affected by posture (in addition to diet and drugs). Lower values are obtained from subjects in the supine position compared with subjects after 1 or 2 hours ambulation. It may be desireable or necessary at times to determine PRA in patients in the supine state rather than in the ambulatory state. In such cases, it is important to have a method capable of yielding the maximum value of renin activity in plasma. PRA is generally measured by the quantitative determination of Angiotensin I. Angiotensin I can be lost after it has been produced if not effectively inhibited as can be seen from the multireaction system shown below.

1. Angiotensinogen $\xrightarrow{Renin}$ Angiotensin I
2. Angiotensin I $\xrightarrow[Ca^{++}, Mg^{++}]{Converting\ enzyme}$ Angiotensin II + Dipeptide
3. Angiotensin II $\xrightarrow{Angiotensinase}$ Inactive peptides It is important then to have compound(s) present in this system which will serve as inhibitor(s) of the side reactions thereby effectively yielding the maximum amount of Angiotensin I.

Commercially available kits for the measurement of PRA by determination of Angiotensin I recommend an uncontrolled pH or alternatively, a pH of 6.0 for the incubation step. They use ethylenediaminetetraacetic acid (EDTA), 8-hydroxyquinoline, and dimercaprol as inhibitors of the side reactions that interfere with the yield of Angiotensin I. These conditions do not yield the maximum amount of Angiotensin I. Reports have appeared in the literature suggesting the use of diisopropylfluorophosphate (DFP) in combination with EDTA at pH 5.7. The biggest drawback of this approach is that DFP is very toxic, and extreme care must be exercised in its use.

It is an object of the present invention to provide an inhibitor in the determination of Angiotensin I in fluids such as plasma which in combination with the best pH gives greater yields of Angiotensin I providing improved sensitivity in the diagnostic determination of PRA.

It is a further object to provide an inhibitor especially useful for detecting Angiotensin I in blood which is safer and more convenient to handle and has improved detection characteristics over prior art test articles.

It is a further object to provide an inhibitor which could also be used for the measurement of Angiotensin II in blood as an alternative to Angiotensin I in the determination of renin activity.

BRIEF SUMMARY OF THE INVENTION

In accordance with the invention, phenylmethyl sulfonylfluoride (PMSF) in combination with EDTA preferably at pH 5.6-6.0, inhibit side reactions in the yield of Angiotensin I, thus, significantly maximizes the production of Angiotensin I, in the method for the measurement of renin activity.

DETAILED DESCRIPTION OF THE INVENTION

The reagents used are:
1. 8-hydroxyquinoline solution: 660 mg dissolved in 10 ml of water.
2. Dimercaprol solution: 300 mg 2-3 dimercaptopropanol and 600 mg benzyl benzoate in 3 ml peanut oil.
3. Phenylmethyl sulfonylfluoride: 0.1 gm PMSF dissolved in 1.5 ml of 95 percent ethanol (0.38 molar solution).
4. Neomycin sulfate: 0.1 gm dissolved in 1 ml of water.
5. Diisopropylfluorophosphate: 0.1 ml DFP in 1.9 ml isopropyl alcohol.
6. $I^{125}$ Angiotensin I, Angiotensin I standard, Angiotensin I antibody, and charcoal were purchased as a kit (E. R. Squibb & Co.). These reagents were prepared and used following the manufacturer's directions.

The collection of blood should be in a cold Vacutainer containing EDTA (liquid EDTA preferred), inverted several times and packed in ice immediately. Centrifugation is carried out in the cold to collect the plasma. The plasma is kept in ice if processed within two hours or it can be frozen at $-10°C$ until ready for use. In preparing the sample, if the sample has been frozen, it is allowed to thaw while immersed in crushed ice. It should be noted that from the time the plasma sample is obtained, all manipulations are carried out in the cold (4°C), unless otherwise specified.

Using a pH meter, the pH of the sample is adjusted to 5.5-5.7 with 0.5 M HCl (3 to 5 drops). I shall refer to this range as pH 5.6. Other pH levels were achieved by additions of various quantities of 0.5 M HCl.

Three different sets of inhibitors were tested and therefore, to 1 ml of plasma is added one of the following sets of reagents:
1. 10 µl of 8-hydroxyquinoline solution and 10 µl of dimercaprol solution.
2. 20 µl of phenylmethyl sulfonylfluoride solution and 20 µl of neomycin sulfate. Neomycin sulfate is always added when PMSF is added unless specified otherwise.
3. 20 µl of diisopropylfluorophosphate solution and 20 µl of neomycin sulfate solution.

The mixture is then vigorously mixed and divided into four aliquots. In the incubation, of the four aliquots per specimen, two are placed in a shaking water bath at 37°C for 3 hours. The other two aliquots, to be used as blanks, are kept in the ice bath (about 4°C) for the same amount of time.

In the radioimmunoassay, to four tubes containing 1 ml of diluted $I^{125}$ Angiotensin I, 50 and 10 µl from each of the two aliquots incubated at 37°C are added. These two sets of different size aliquots are considered duplicates. To two other tubes, 50 µl are added from each of the two aliquots incubated at 4°C. These two tubes represent duplicate blanks. To all the tubes, 50 µl of Angiotensin I antiserum are added and the mixtures incubated in the refrigerator (4°–8°C) for 24 hours, ± 2 hours.

Upon completion of this 24-hour incubation, 1 ml of charcoal suspension is added to each tube and centrifuged immediately for 4 minutes at 2,500 rpm. The supernatant is withdrawn quickly from each tube with Pasteur pipettes and placed into similar tubes to be counted.

A standard curve is prepared by setting up tubes with known amounts of Angiotensin I and following the same procedure used with the samples.

Table I shows data comparing the plasma renin activity obtained when two different sets of inhibitors were used with the same plasma specimen adjusted to different pH levels. At all pH levels tested there was an enhancement of the Angiotensin I produced when PMSF was used in place of 8-hydroxyquinoline and dimercaprol. The greatest amount of Angiotensin I being produced at pH 6.0.

TABLE I (1)

PLASMA RENIN ACTIVITY AT DIFFERENT pH LEVELS USING TWO SETS OF INHIBITORS

| pH | PRA 8-Hydroxyquinoline and Dimercaprol (ng Angio I/ml/hr) | PRA PMSF (ng Angio I/ml/hr) | % Enhancement |
|---|---|---|---|
| 4.0 | 0.8 | 1.6 | 50 |
| 5.0 | 1.3 | 3.3 | 61 |
| 5.6 | 2.1 | 3.6 | 42 |

TABLE I (1)-continued

PLASMA RENIN ACTIVITY AT DIFFERENT pH LEVELS USING TWO SETS OF INHIBITORS

| pH | PRA 8-Hydroxyquinoline and Dimercaprol (ng Angio I/ml/hr) | PRA PMSF (ng Angio I/ml/hr) | % Enhancement |
|---|---|---|---|
| 6.0 | 2.1 | 4.1 | 49 |
| 7.0 | 1.8 | 2.9 | 38 |
| 7.4 | 1.4 | 2.2 | 36 |

Different quantities of PMSF yield greater amounts of Angiotensin I than 8-hydroxyquinoline and dimercaprol as shown in Tables II (2) and III (3). Although 20 μl of the PMSF solution seems to yield the maximum amount of Angiotensin I, 10 μl to 50 μl are shown to yield more Angiotensin I than 8-hydroxyquinoline and dimercaprol. Similar effects are exhibited with the addition of PMSF equivalent to 1 μl, that is, the addition of 20 μl, per ml of plasma, of a 20-fold dilution of the original solution.

PMSF (phenylmethyl sulfonylfluoride) added in a range of concentration of 1 to 50 ul/ml of plasma of a 0.38 Molar phenylmethyl sulfonylfluoride is the same as a final concentration of PMSF of 0.066 to 3.3 mg of phenylmethyl sulfonylfluoride per mililiter of plasma.

TABLE II (2)

COMPARISON OF PLASMA REMIN ACTIVITY AT pH 5.6 USING TWO SETS OF INHIBITORS

| No. | 8-Hydroxyquinoline and Dimercaprol, pH 5.6 (ng Angio I/ml/hr) | PMSF pH 5.6 (ng Angio I/ml/hr) | % enhancement of PRA employing PMSF |
|---|---|---|---|
| 1 | 2.9 | 3.9 | 26 |
| 2 | 2.2 | 3.6 | 39 |
| 3 | 1.1 | 1.8 | 39 |
| 4 | 2.7 | 3.8 | 29 |
| 5 | 2.0 | 3.0 | 34 |
| 6 | 4.8 | 8.3 | 42 |
| 7 | 2.1 | 3.9 | 47 |
| 8 | 4.2 | 6.6 | 37 |
| 9 | 0.7 | 1.1 | 36 |
| 10 | 1.3 | 2.4 | 46 |
| 11 | 0.8 | 1.3 | 39 |
| 12 | 0.7 | 0.9 | 23 |
| 13 | 1.2 | 2.0 | 40 |
| 14 | 3.6 | 5.3 | 33 |
| 15 | 0.4 | 0.8 | 50 |
| 16 | 0.6 | 1.0 | 40 |
| 17 | 1.8 | 2.4 | 25 |
| 18 | 3.5 | 5.7 | 39 |
| 19 | 3.4 | 4.2 | 20 |
| 20 | 6.1 | 12.5 | 51 |
| 21 | 1.6 | 2.2 | 28 |
| 22 | 2.1 | 2.3 | 9 |
| 23 | 5.2 | 5.3 | 2 |
| 24 | 8.0 | 9.6 | 17 |
| 25 | 0.7 | 1.0 | 30 |
| 26 | 0.8 | 1.2 | 34 |
| 27 | 0.6 | 0.7 | 14 |
| 28 | 0.5 | 0.8 | 38 |
| 29 | 0.7 | 1.1 | 36 |
| 30 | 0.5 | 0.9 | 45 |
| 31 | 4.8 | 7.3 | 34 |
| 32 | 0.5 | 0.7 | 29 |
| 33 | 0.7 | 0.8 | 12 |
| 34 | 1.4 | 2.8 | 50 |
| 35 | 0.5 | 1.2 | 59 |
| 36 | 1.1 | 2.3 | 52 |
| 37 | 1.4 | 2.2 | 37 |
| 38 | 1.6 | 2.1 | 24 |
| 39 | 0.6 | 1.0 | 40 |
| 40 | 0.7 | 1.2 | 42 |
| 41 | 0.8 | 0.9 | 12 |
| 42 | 4.5 | 6.0 | 25 |
| 43 | 2.9 | 3.2 | 10 |
| 44 | 1.4 | 2.5 | 44 |
| 45 | 0.5 | 0.8 | 37 |
| 46 | 0.6 | 0.9 | 33 |

TABLE III (3)

PLASMA RENIN ACTIVITY AT pH 5.6 USING THREE DIFFERENT QUANTITIES OF PMSF

| No. | PMSF 20 μl/ml (ng Angio I/ml/hr) | PMSF 10 μl/ml (ng Angio I/ml/hr) | %* | PMSF 40 μl/ml (ng Angio I/ml/hr) | %* |
|---|---|---|---|---|---|
| 1 | 3.9 | | | 2.9 (a) | 74 |
| 2 | 3.6 | | | 2.5 (a) | 69 |
| 3 | 1.8 | | | 1.4 (a) | 78 |
| 4 | 3.8 | | | 2.7 (a) | 71 |
| 5 | 3.0 | | | 2.8 | 93 |
| 6 | 8.3 | | | 5.3 | 64 |
| 7 | 3.9 | | | 2.9 | 74 |
| 8 | 6.6 | | | 5.7 | 86 |
| 9 | 1.1 | | | 0.9 | 81 |
| 10 | 2.4 | | | 1.8 | 75 |
| 11 | 1.3 | | | 1.1 | 84 |
| 12 | 0.9 | | | 0.8 | 88 |
| 13 | 2.0 | | | 1.7 | 85 |
| 14 | 5.3 | | | 4.2 | 79 |
| 15 | 0.8 | | | 0.5 | 62 |
| 16 | 1.0 | | | 0.7 | 70 |
| 17 | 2.4 | 2.1 | 87 | | |
| 18 | 5.7 | 5.4 | 94 | | |
| 19 | 4.2 | 4.0 | 95 | | |
| 20 | 12.5 | 12.0 | 96 | | |
| 21 | 2.2 | 2.0 | 90 | | |
| 22 | 2.3 | 2.2 | 95 | | |
| 23 | 5.3 | 4.4 | 83 | | |
| 24 | 9.6 | 7.9 | 82 | | |
| 25 | 1.0 | 0.8 | 80 | | |
| 26 | 1.2 | 1.1 | 91 | | |
| 27 | 0.7 | 0.6 | 85 | | |
| 28 | 0.8 | 0.8 | 100 | | |
| 29 | 1.1 | 1.0 | 91 | | |
| 30 | 0.9 | 0.7 | 78 | | |

*PRA using 20 μl PMSF in first column represents 100%.
(a) 50 μl PMSF used in these samples.

PMSF has an inhibitory effect comparable to DFP on side reactions affecting the production of Angiotensin I (Table IV) (4). In every sample tested, PMSF was as good as or a better inhibitor than DFP. The PRA measured employing DFP ranged between 71 and 100 percent of that obtained with PMSF. In addition, PMSF, an inhibitor of trypsin and chemotrypsin, does not inhibit acetylcholinesterase. The extreme toxicity of DFP is due to its inhibition of acetylcholinesterase.

TABLE IV (4)

PLASMA RENIN ACTIVITY AT pH 5.6 USING DFP AND PMSF.

| No. | PMSF 20 μl/ml (ng Angio I/ml/hr) | DFP 20 μl/ml (ng Angio I/ml/hr) | %* |
|---|---|---|---|
| 1 | 7.3 | 6.0 | 82 |
| 2 | 0.7 | 0.5 | 71 |
| 3 | 0.8 | 0.8 | 100 |
| 4 | 2.8 | 2.1 | 75 |
| 5 | 1.2 | 1.0 | 83 |
| 6 | 2.3 | 2.0 | 87 |
| 7 | 2.2 | 2.1 | 95 |
| 8 | 2.1 | 2.0 | 95 |
| 9 | 1.0 | 1.0 | 100 |
| 10 | 1.2 | 1.0 | 83 |
| 11 | 0.9 | 0.8 | 89 |
| 12 | 6.0 | 5.6 | 93 |
| 13 | 3.2 | 2.9 | 90 |
| 14 | 2.5 | 2.3 | 92 |
| 15 | 0.8 | 0.7 | 87 |
| 16 | 0.9 | 0.7 | 77 |

*PRA using 20 μl PMSF in first column represents 100%.

Table V (5) shows that when PMSF is present, PRA as measured by Angiotensin I, is not affected by the presence or absence of neomycin sulfate in a 3 hour incubation. The antibacterial agent neomycin sulfate may be needed if longer incubation is desired.

TABLE V (5)

PLASMA RENIN ACTIVITY USING PMSF IN THE PRESENCE AND ABSENCE OF NEOMYCIN SULFATE

| No. | PRA PMSF with Neomycin sulfate (ng Angio I/ml/hr) | PRA PMSF without Neomycin sulfate (ng Angio I/ml/hr) |
|---|---|---|
| 1. | 2.2 | 2.4 |
| 2. | 3.9 | 3.9 |
| 3. | 1.7 | 1.6 |
| 4. | 3.7 | 3.8 |
| 5. | 2.6 | 2.9 |
| 6. | 3.6 | 3.8 |
| 7. | 1.6 | 1.4 |
| 8. | 4.3 | 4.0 |

Table VI (6) presents data, the interpretation of which is consistent with the idea that PMSF (as DFP) is an inhibitor of side reactions in the production of Angiotensin II, in other words it inhibits the angiotensinases that convert Angiotensin II to inactive peptides, while 8-hydroxyquinoline and dimercaprol seem to inhibit the converting enzyme which catalyzes the production of Angiotensin II from Angiotensin I.

TABLE VI (6)

EFFECTS OF SETS OF INHIBITORS AND COMBINATIONS OF INHIBITORS ON PRA

| No. | PRA 8-Hydroxyquinoline and Dimercaprol (ng Angio I/ml/hr) | PRA PMSF (ng Angio I/ml/hr) | PRA 8-Hydroxyquinoline and Dimercaprol and PMSF (ng Angio I/ml/hr) |
|---|---|---|---|
| 1. | 1.3 | 2.8 | 1.3 |
| 2. | 2.1 | 3.6 | 2.2 |
| 3. | 1.6 | 2.7 | 1.6 |
| 4. | 3.1 | 4.3 | 3.4 |
| 5. | 2.0 | 3.1 | 2.1 |
| 6. | 1.8 | 3.2 | 2.2 |
| 7. | 2.7 | 4.4 | 2.9 |
| 8. | 2.1 | 3.7 | 2.3 |

By the blockage exerted by PMSF, the equilibrium is shifted to the left, yielding more Angiotensin I. If PMSF is used in the presence of 8-hydroxyquinoline and dimercaprol, the equilibrium of the reaction catalyzed by the converting enzyme cannot be displaced to yield more Angiotensin I as Angiotensin II accumulates, and as a consequence the Angiotensin I produced is very similar to when only 8-hydroxyquinoline and dimercaprol are used. Its mechanism of action would make PMSF a good inhibitor of the side reaction leading to the destruction of Angiotensin II making its measurement an alternative in the determination of PRA.

I claim:

1. In a method for measuring plasma renin activity in plasma wherein the plasma pH is adjusted in the presence of EDTA, adding inhibitors of the side reactions that interfere with the yield of Angiotensin I, incubation at 37° C to release Angiotensin I from the plasma, determining the amount of Angiotensin I, that improvement consisting of adding as inhibitor against Angiotensin I destruction phenylmethyl sulfonylfluoride so that the final concentration of phenylmethyl sulfonylfluoride is 0.066 to 3.3 mg of phenylmethyl sulfonylfluoride per milliliter of plasma, adjusting the pH to 4.0 to 7.4, and said inhibitor being effective to inhibit side reactions in the yield of Angiotensin I.

2. A method as claimed in claim 1 wherein the plasma is optimally adjusted to pH 6 and the concentration of phenylmethyl sulfonylfluoride is 1.32 mg. phenylmethyl sulfonylfluoride per milliliter of plasma.

* * * * *